US012607286B2

(12) United States Patent
Gunzel et al.

(10) Patent No.: US 12,607,286 B2
(45) Date of Patent: Apr. 21, 2026

(54) COUPLING FOR MULTI-WALLED LINES

(71) Applicant: NEXANS, Courbevoie (FR)

(72) Inventors: Gerald Gunzel, Vechelde (DE); Ralf Egerer, Hannover (DE)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 18/435,858

(22) Filed: Feb. 7, 2024

(65) Prior Publication Data

US 2024/0271736 A1     Aug. 15, 2024

(30) Foreign Application Priority Data

Feb. 15, 2023     (EP) ..................................... 23305205

(51) Int. Cl.
*F16L 39/00*          (2006.01)
*F16L 59/065*        (2006.01)

(52) U.S. Cl.
CPC ........... *F16L 39/005* (2013.01); *F16L 59/065* (2013.01)

(58) Field of Classification Search
CPC ....... F16L 59/065; F16L 59/075; F16L 59/18; F16L 59/184; F16L 59/141; F16L 27/107; F16L 27/108; F16L 27/11; F16L 39/00; F16L 39/005; F16L 23/02
See application file for complete search history.

(56) References Cited

U.S. PATENT DOCUMENTS 6,533,334 B1     3/2003  Bonn
7,399,002 B2     7/2008  Motew et al.

FOREIGN PATENT DOCUMENTS

WO       WO-2015122310 A1 *  8/2015  .............. F16L 13/02

OTHER PUBLICATIONS

WO 2015122310 translation (Year: 2015).*

* cited by examiner

*Primary Examiner* — Aaron M Dunwoody
(74) *Attorney, Agent, or Firm* — MUNCY, GEISSLER, OLDS & LOWE, P.C.

(57)          ABSTRACT

A coupling for connecting a first and a second multi-walled line (203,204) having at least two concentric pipes (206,207) has a female coupling part (202) with at least two concentric tubes including an inner and an outer tube (217,218) each connected at one end with one of the concentric pipes (206,207) of the first multi-walled line (204), respectively. The coupling further has a male coupling (201) part having at least two concentric tubes including an inner and an outer tube (210,211) each connected at one end with one of the concentric pipes (206,207) of the second multi-walled line (203). The at least two concentric tubes of the female and/or male coupling parts are compressible and/or expandable in an axial direction to ensure a fluid tight connection between the male and female coupling part is already achieved when the coupling has not yet reached its operation temperature.

12 Claims, 4 Drawing Sheets

COUPLING FOR MULTI-WALLED LINES

RELATED APPLICATION

This application claims the benefit of priority from European Patent Application No. 233 052 05.9, filed on Feb. 15, 2023, the entirety of which is incorporated for reference.

FIELD

The present disclosure relates to a plug-in coupling for multi-walled flexible lines, also known as a "Johnston coupling". Multi-walled flexible lines include in particular vacuum-insulated lines but also lines in which the space between the walls or pipes of the lines is filled with air, an inert gas, or a medium for temperature control of the line.

BACKGROUND

Cryogenic media, also known as cryogenic fluids, are often transported on ships, in tanker wagons or on tanker trucks. Important examples include liquefied natural gas (LNG), which has an evaporating temperature of −162° C. (111 K), liquid nitrogen with an evaporating temperature of −196° C. (77 K), liquid hydrogen (evaporating temperature −253° C., 20 K) or liquid helium (evaporating temperature −269° C., 4 K). The transfer from one tank to another during loading is typically accomplished with vacuum insulated lines and couplings.

For transfer purposes, the transfer lines are designed to be flexible and are provided at least at one end with a rigid so-called Johnston coupling, with which two cryogenic lines can be detachably connected without interrupting the thermal insulation at the connection point.

For the transfer the transfer lines are coupled to tanks to be connected, subsequently rendered inert by purging, and cooled down to operation temperature. Before decoupling the transfer line is warmed up to ambient temperature and rendered inert. During the complete operation the couplings must be tight against the environment while the temperature of components of the coupling varies between ambient and cryogenic temperatures.

A Johnston coupling is disclosed, for example, in EP 1 957 851 B1 and is shown in FIG. 1. A first seal 132 seals the two coupling halves against each other in the cold area. A second seal 120 seals the two coupling halves against each other in the warm area. This creates a dead space between the two seals. When the coupling is warm, the second seal 120 primarily seals the two coupling halves against each other. When the coupling is cold, the first seal 132 provides the primary seal and the second seal 120 serves as a redundancy.

In simple terms, in a Johnston coupling two rigid double-walled vacuum-insulated coupling parts 103, 104 are inserted into each other. The inner diameters of the coupling parts are typically between 10 mm and 200 mm. In principle, however, smaller or larger inside diameters are also possible. The male coupling part 103 is plugged into the female coupling part 104. The male and female coupling parts are also referred to as coupling plug 103 and coupling socket 104.

Since the first seal 132 only works properly when it is cold, the exact distance between the first and second seal is crucial for the correct operation of the first seal. Slight deviations due to manufacturing tolerances will result in permanent leakage of one or the other seal. Therefore, manufacturing tolerances are quite tight which increases the production costs.

The two seals 120, 132 create a dead space between the male coupling part and the female coupling part, in which a certain amount of cryogenic fluid is accumulated and captured during cooling because the seal 132 is not completely tight at the beginning of the cooling process. The amount of captured cryogenic fluid cannot be completely removed from the dead space when the coupling is in its coupled state. Therefore, the captured cryogenic fluid enters the environment during uncoupling of the coupling parts. If the fluid is hazardous, e.g. inflammable, toxic etc., this will pollute the environment and imperil the operators of the transfer line.

In the context of the present application the term fluid is to be understood as any kind of flowable material that can have a solid, liquid, or gaseous state of aggregation. In this sense fluids also include solid powders that can be pumped and flow through transfer lines like a liquid. Furthermore, fluids also include aerosols and emulsions.

The described double-walled vacuum insulated line is taken only as an example for other types of multi-walled lines mentioned above. Conventional couplings for multi-walled lines frequently have the problem that they are not gas tight when the coupling has not yet reached its operation temperature which entails the problems described above.

In the context of the present application the term tube, pipe or line is to be understood as conduct with any kind of cross-sectional shape.

In view of the limitations of existing couplings there remains a desire for an improved coupling to overcome or at least improve one or more of the problems mentioned at the outset.

OBJECTS AND SUMMARY

According to a first aspect the present disclosure suggests a coupling for connecting a first and a second multi-walled line each one having at least two concentric pipes, which are separated by a space. The coupling comprises a female coupling part comprising at least two concentric tubes including an inner and an outer tube each connected at one end with one of the concentric pipes of the first multi-walled line. The other ends of the at least two concentric tubes are joined in a gas tight manner. The inner tube is provided with a sealing surface. The coupling further comprises a male coupling part comprising at least two concentric tubes including an inner and an outer tube each connected at one end with one of the concentric pipes of the second multi-walled line. The other ends of the at least two concentric tubes of the male coupling part are joined in a gas tight manner. The at least two concentric tubes of the female and/or male coupling parts are compressible and/or expandable in an axial direction.

When in the coupled state the proposed coupling generates a pressure force by which a fluid tight connection between the male and female coupling part is already achieved when the coupling has not yet reached its operation temperature. I.e. the coupling is already gas tight when for instance a transfer line for cryogenic fluids is still warm. Normally, the coupling becomes fluid and/or gas tight only after it has reached its operation temperature. As a result, lose manufacturing tolerances are acceptable because the tolerances are compensated by the amount of compression and/or expansion of the male and/or female coupling part. Due to the elastic compression and/or expansion of the male and/or female coupling parts the materials they are made from can be different and can have different coefficients of thermal expansion. Therefore, the materials of the coupling parts may be chosen to adapt the coupling to specific needs.

Advantageously, the at least two concentric tubes of the female and/or male coupling are corrugated. Corrugation is a convenient way to make the concentric tubes compressible and/or expandable in an axial direction of the tubes.

In an advantageous embodiment the coupling comprises a seal that is arranged between the sealing surface of the female coupling part and a front end of the male coupling part. The seal can be made from e.g. metal, polymer or rubber. The female and/or male coupling parts being compressible and/or expandable ensure that the seal receives a sufficient axial pressure to make it fluid tight even when the coupling has not yet reached its operation temperature and in the presence of significant manufacturing tolerances.

In a useful embodiment the seal is attached to the female or male coupling part.

Advantageously, the sealing surface is angled relative to the axial direction of the inner tube. Specifically, the sealing surface can take the form of a step but other shapes such as e.g. bevel, fillet, etc. are also technically possible. Furthermore, the sealing surface, step, seal, etc. do not have to have a circular cross-section. Oval, polygonal or any cross-sectional shapes are also technically conceivable.

With advantage the female and male coupling parts comprise a flange. The flanges serve as mechanical means to firmly connect the male and female coupling part.

In an advantageous embodiment a seal is arranged between the flanges. The seal is in the warm part of the coupling and is a backup or redundancy for the seal in the cold part of the coupling. Due to the corrugation the length of the thermal path is increased. This improves the thermal insulation of the coupling simply because the thermal resistance between the seal between the sealing surface and a front face of the male coupling part and the seal between the flanges is increased. Consequently, the length of the coupling required to achieve a given level of thermal insulation may be shorter if the concentric tubes are corrugated than if they are not.

In a further embodiment of the coupling according to the present disclosure the sealing surface of the female coupling part is provided with a collar. The collar serves as a convenient holding means for a seal in the cold part of the coupling.

The collar can accommodate a tubular seal on its inner or outer perimeter. The tubular seal can be ring-shaped.

Advantageously, the tubular seal has a larger or smaller coefficient of thermal expansion than the collar. When cold fluid such as a cryogenic fluid streams through the coupling the seal shrinks more or less than the collar. When the tubular seal is fitted on the outer or inner perimeter of the collar an additional frictional connection between the collar and the seal is realized.

In useful embodiments of the coupling the space between the at least two concentric pipes of the first and/or second multi-walled line is evacuated, filled with air, or inert gas or with a medium for temperature control of the inner pipe. These embodiments are adapted to various applications in which different types of transfer lines need to be coupled.

In a preferred embodiment of a coupling according to the present disclosure the distance between the front end of the male coupling part and a contact surface of the associated connection flange is larger than the distance between the surface of the sealing surface of the female coupling part and a contact surface of the associated connection flange. Due to this arrangement the seal arranged between the sealing surface of the female coupling part and the front end of the male coupling part are always compressed even when manufacturing tolerances are present that exceed thermal expansion or shrinking of the coupling when the temperature of the coupling varies during the operation of the coupling.

According to a second aspect the present disclosure suggests a transfer device for cryogenic fluids comprising a coupling according to the first aspect of the present disclosure.

BRIEF DESCRIPTION OF THE DRAWINGS

Exemplary embodiments of the present disclosure are illustrated in the drawings and are explained in more detail in the following description. In the figures, the same or similar elements are referenced with the same or similar reference signs. It shows.

The figures are purely schematic and do not reflect real measures and dimensions of the illustrated objects.

DETAILED DESCRIPTION

Figure 1:
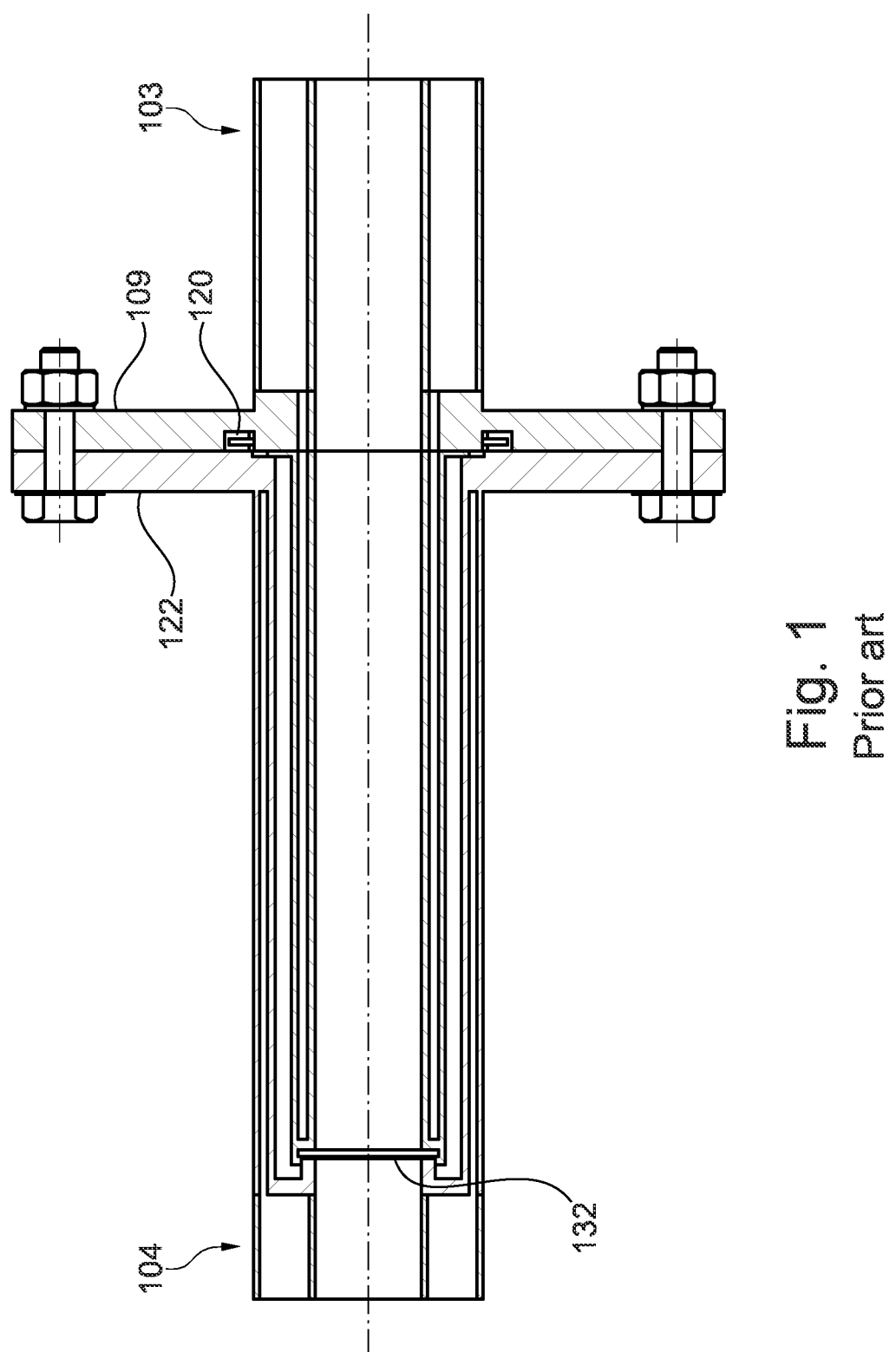
FIG. 1 a conventional Johnston coupling known in the prior art.
Figure 2A:
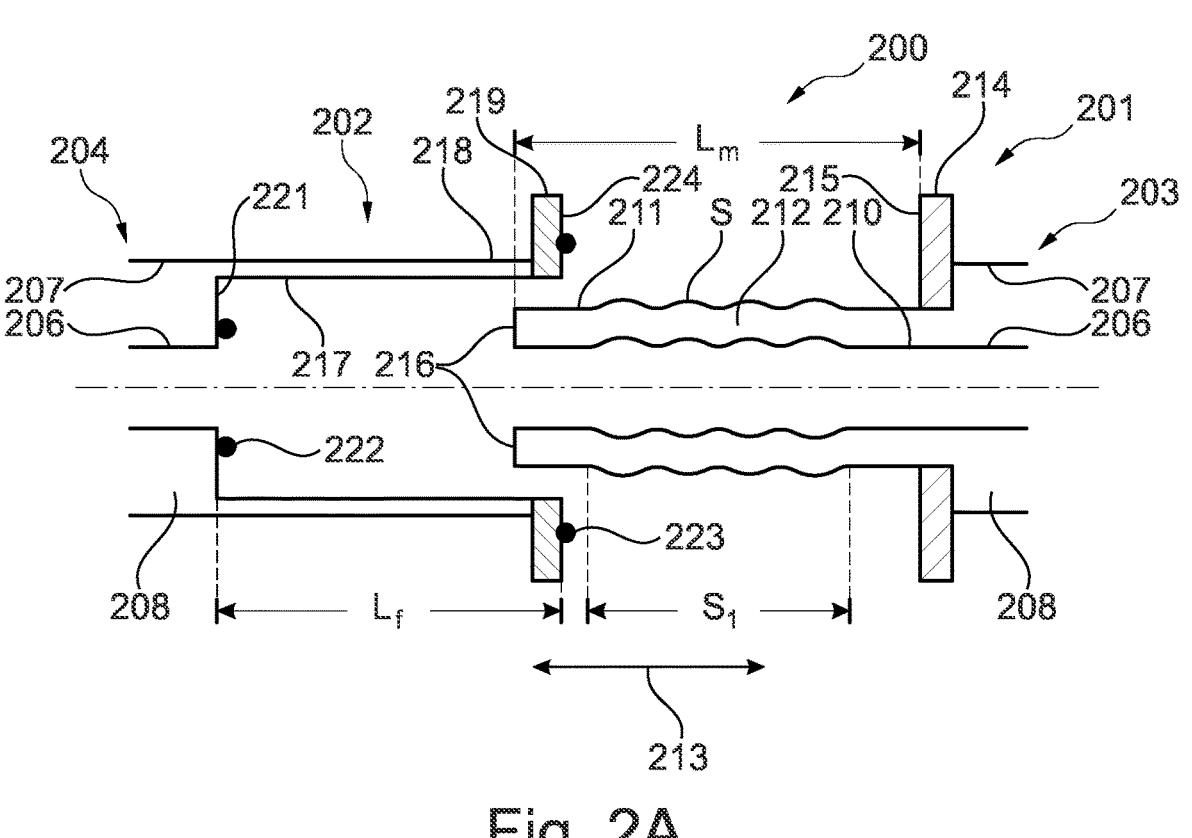
FIG. 2A a first embodiment of a coupling according to the present disclosure in an un-coupled state.

FIG. 2A shows a first embodiment of a coupling 200 according to the present disclosure. The coupling 200 comprises a male coupling part 201 and a female coupling part 202. The male coupling part 201 is connected with a first vacuum insulated transfer line 203. The female coupling part 202 is attached to a second vacuum insulated transfer line 204. The transfer lines 203, 204 have an inner pipe 206 and an outer pipe 207. Between the inner and outer pipes 206, 207 there is an evacuated space 208 for insulation purposes.

The male coupling part 201 comprises an inner tube 210 and an outer tube 211, which are separated by a space 212. The inner and outer tubes 210, 211 are corrugated in a section S with the length s1. The corrugated section S gives flexibility to the male coupling part 201 in an axial direction indicated in FIG. 2A with a double arrow 213. More specifically, the male coupling part 201 is compressible and expandable in the directions of double arrow 213. The inner tube 210 of the male coupling part 201 is connected with the inner pipe 206 of the first transfer line 203. The outer tube 211 is connected with a flange 214 on a contact surface 215 of the flange 214. The outer pipe 207 of the first transfer line 203 is connected with an opposite side of the flange 214 in a vacuum tight fashion. The space 212 communicates with evacuated space 208 of the first transfer line 203. As a result, vacuum insulation between the inner and outer tube 210, 211 of the male coupling part 201 is achieved. Opposite to the flange 214 the inner and outer tubes 210, 211 are joined in a vacuum tight manner to form a front face 216 of the male coupling part 201. A length Lm of the male coupling part 201 is defined as the distance between the front face 216 and the contact surface 215 of the flange 214.

The female coupling part 202 comprises an inner tube 217 and an outer tube 218. Ends of the inner and outer tubes 217, 218 are connected with a flange 219. Opposite ends of the inner and outer tubes 217, 218 are connected with the inner and outer pipes 206, 207, respectively, of the second transfer line 204. The inner tube 217 forms a circular step 221 which bridges a difference a diameter of the inner tube 217 to a smaller diameter of the inner pipe 206. In the embodiment shown in FIG. 2A the circular step 221 is an integral part of the inner tube 217. In other embodiments the circular step 221 is formed by a ring welded to the inner tube 217. A skilled person may conceive further ways how to create the circular step 221. On the circular step 221 a circular seal 222 is attached. The seal 222 has a diameter that essentially corresponds to the diameter of the front face 216 of the male coupling part 201. The seal 222 is made for instance from metal, polymer, or rubber. The flange 219 carries a circular seal 223. A length Lf of the female coupling part 202 is defined as the distance between the circular step 221 and a contact surface 224 of the flange 219. The length Lf of the female coupling part 202 is for instance 1 to 3 mm shorter than the length Lm of the male coupling part 201. For the sake of simplicity, the thickness of the seals 222 and 223 is neglected because it will lead only to a certain additional compression of the male coupling part 201.

In the embodiment shown in FIG. 2A the step 221 functions as a sealing surface for the seal 222. In other embodiments the sealing surface does not necessarily have to be a step. Other shapes such as bevel, fillet, etc. are also technically possible. Furthermore, the sealing surface, step, seal, etc. do not have to have a circular cross-section. Oval, polygonal and similar cross-sections are also technically conceivable.

Figure 2B:
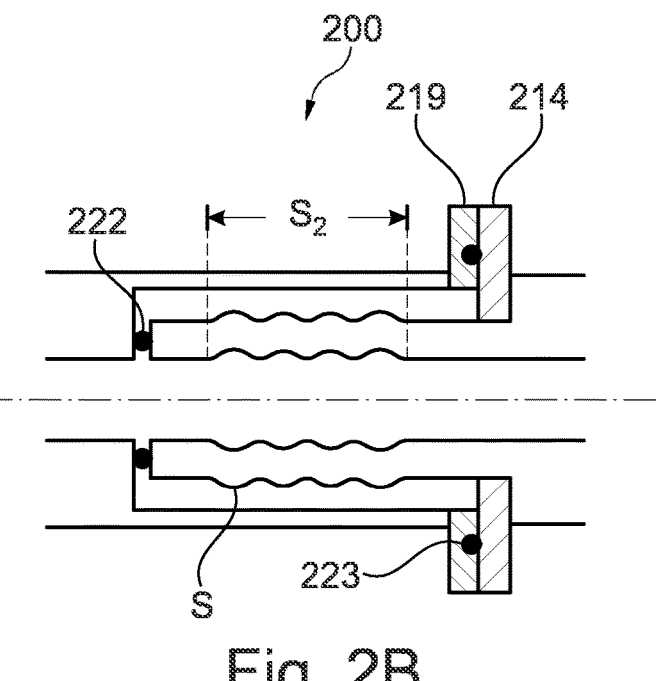
FIG. 2B the coupling shown in FIG. 2A in a coupled state.

For connecting the coupling 200, the male coupling part 201 is inserted into the female coupling part 202. FIG. 2B shows the coupling 200 in its connected state. In the connected state the flanges 214 and 219 are tightly connected with screws or clamps (not shown in FIG. 2B). Since Lf<Lm the corrugated section S is compressed to a length s2<s1 when the contact surfaces 215, 224 of the flanges 214, 219 are in direct contact. Due to the compression of the corrugated section S the seal 222 is compressed already in a warm state of the coupling 200. As a result, the seal 222 is fluid tight already when the coupling 200 is coupled even before it is cooled down to the operational temperature of the coupling 200. In consequence, no fluid can enter the dead space enclosed by the seal 222 and the seal 223. The difference of 1 to 3 mm between the length Lf of the female coupling part 202 and the length Lm of the male coupling part 201 is normally sufficient to compensate even lose manufacturing tolerances for the male and female coupling part 201, 202, respectively. However, it is noted that the length difference between the male and female coupling parts can be chosen smaller or larger than 1 to 3 mm in case of need and depending on a specific application.

Due to the compression of the male coupling part 201 the seal 222 is fluid tight in all operating states. Therefore, the seal 222 could be omitted but when present, it serves as a backup in case the seal 222 fails for any reason.

For the sake of completeness, it is noted that the seal 222 is at the cold area of the coupling 200 while the seal 223 is in the warm area of the coupling 200.

In a variant of the coupling 200 the seal 222 is attached to the front face 216 of the male coupling part 201 without altering the functionality of the coupling 200.

Normally, the transfer lines 203, 204 are flexible transfer lines with corrugated inner and outer pipes 206, 207. For the sake of simplicity, however, the pipes 206, 207 are shown only schematically in the figures without exhibiting the corrugation.

Figure 3A:
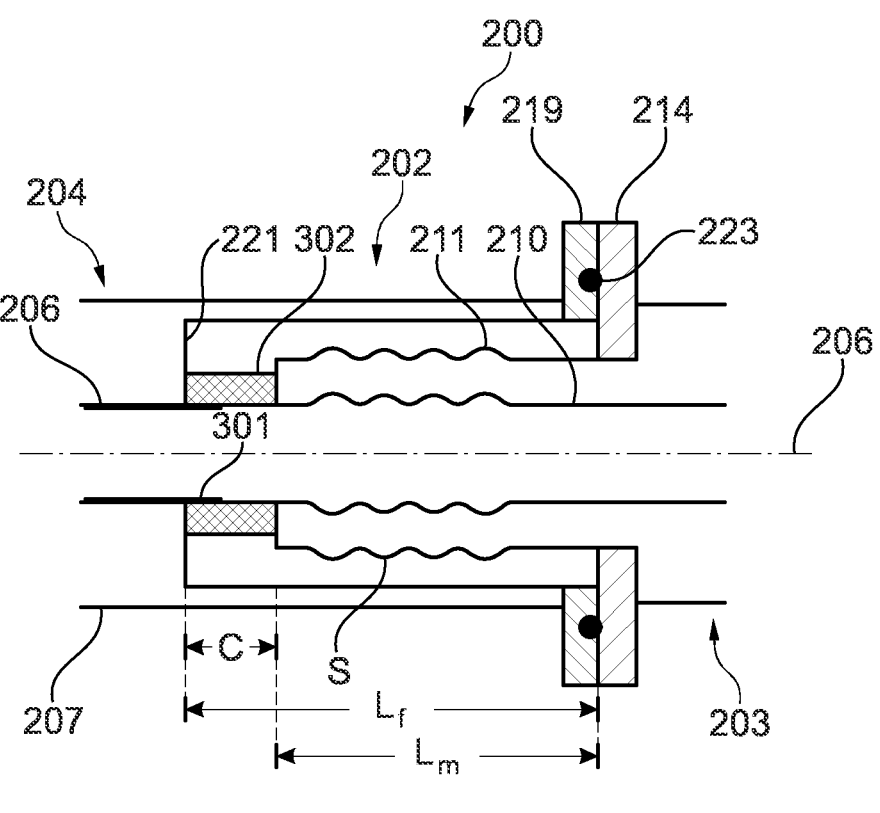
FIG. 3A a second embodiment of a coupling according to the present disclosure in a coupled state.

FIG. 3A illustrates a modified embodiment of the coupling 200. In this embodiment the circular step 221 is provided with a collar 301. The collar 301 is a sort of continuation of the inner pipe 206 of the transfer line 204. A cylindrical seal 302 has an inner diameter corresponding to the outer diameter of the collar 301 and is fitted on the collar 301. The length of the cylindrical seal 302 is c. The length Lm of the male coupling part 201, the length Lf of the female coupling part 202 and the length c of the seal 302 are selected such that Lf<c+Lm in an uncoupled state of the coupling 200. I.e. when the coupling 200 is coupled such that the contact surfaces 215, 224 of the flanges 214, 219 are in direct contact the corrugated section S is compressed and exerts a pressure on the cylindrical seal 302 such that the inner pipes 206 of the transfer lines are connected in a leak tight fashion. This prevents any fluid flowing through the inner pipes 206 from entering in the space between the seals 302 and 223. In addition to that, the seal 302 is made of a material with the higher coefficient of thermal expansion than the collar 301. When the seal 302 cools down when it comes into contact with cryogenic fluid flowing in the inner pipes 206, the seal 302 radially shrinks more than the adjacent collar 301 and an additional frictional connection between the collar 301 and the seal 302 is produced. Again, the thickness of the seal 223 is neglected in this reasoning.

Figure 3B:
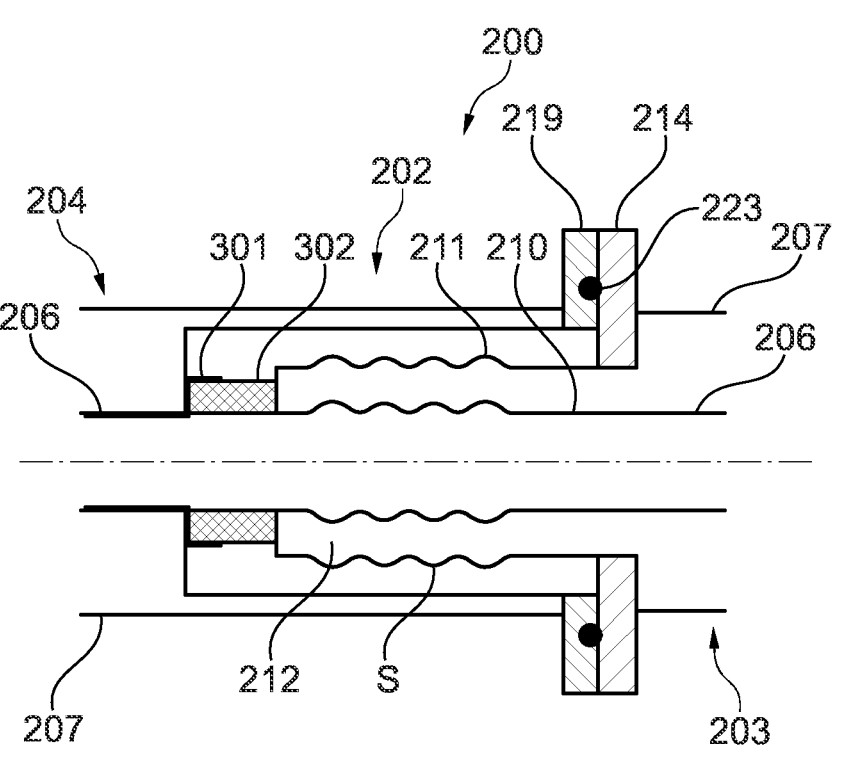
FIG. 3B a modification of the coupling shown in FIG. 3A.

FIG. 3B exhibits a further modified embodiment of the coupling 200. In this embodiment the collar 301 on the circular step 221 has a diameter which is larger than the diameter of the inner pipe 206 but smaller than the diameter of the inner tube 217. In this embodiment the outer diameter of the cylindrical seal 302 corresponds to the inner diameter of the collar 301 such that the seal 302 fits into the collar 301. In this embodiment the seal 302 has a lower coefficient of thermal expansion than the collar 301. On cooling, the seal 302 shrinks less than the adjacent collar 301 and a frictional connection is produced. Apart from that, the coupling 200 shown in FIG. 3B functions in the same way as the coupling 200 of FIG. 3A.

In a variant of the embodiment shown in FIG. 3B, which is not illustrated, the inner diameter of the seal 302 corresponds to the outer diameter of the collar 301. In this variant, the seal 302 as a coefficient of thermal expansion which is larger than the coefficient of thermal expansion of the collar. In this way, when the coupling is cooled by cryogenic fluid than the seal 302 shrinks more than the adjacent collar 301 like it has been described in connection with FIG. 3A.

It is noted that in other embodiments the collar 301 is attached to the male coupling part 201.

Figure 4:
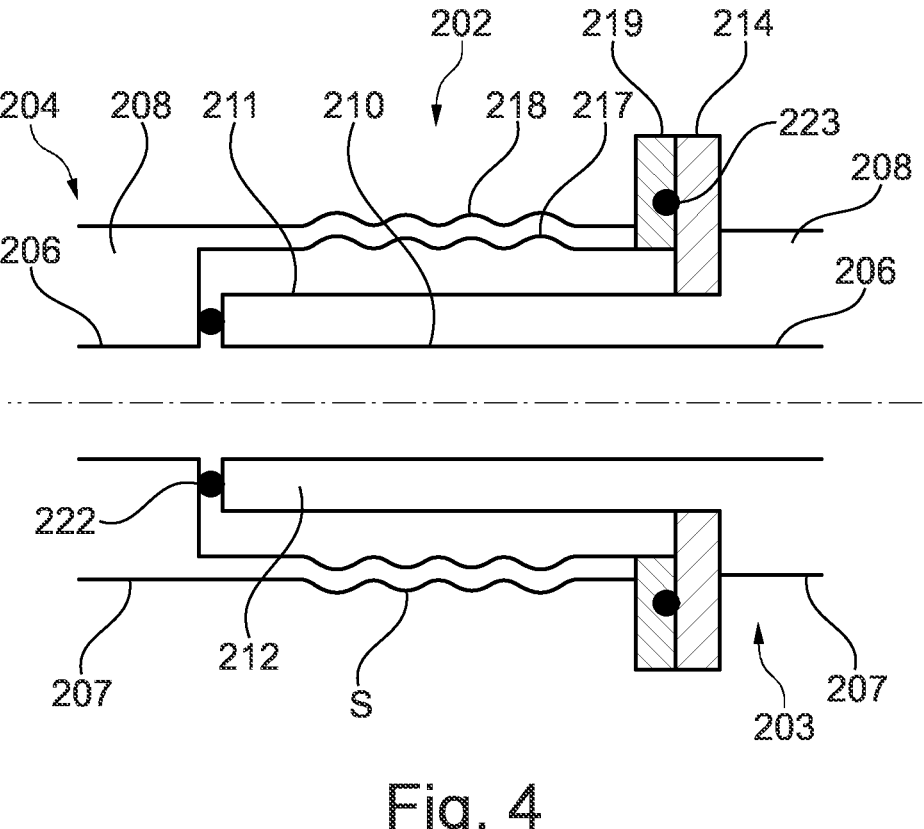
FIG. 4 an alternative embodiment of a coupling according to the present disclosure.

FIG. 4 displays a further embodiment of a coupling 400. In this embodiment the inner and outer tube 217, 218 are corrugated in a section S. The relative length of the male and female coupling parts 201, 202 are the same as it has been described with reference to FIG. 2A. the only difference between the embodiments shown in FIGS. 4 and 2A is that the female coupling part 202 is elastically expanded or elongated for generating the force exerted on the seal 222 by the front face 216 of the male coupling part 201. As it has been described in connection with FIG. 2A, the seal 22 is already leak tight from the very beginning when the coupling 400 is brought into the coupled state and prevents any fluid flowing through the inner pipes 206 from entering in the space between the seals 222 and 223.

Finally, in yet another embodiment of the present disclosure, which is not illustrated in the figures, the inner and outer tubes 210,211,217,218 of both the male and female coupling parts 201, 202 are corrugated. When this coupling is in its coupled state then the length difference between the male and female coupling parts Lm and Lf, respectively, are compensated be a compression of the male coupling part 201, expansion of the female coupling part 202 or a combination of both. As a result, the seal 222 and 302, respectively, on the cold side of the coupling is already leak tight before it has been cooled down to its operational temperature. This effect is achieved by the compression and/or expansion of the male and female coupling parts 201 and 202, respectively.

In the claims, the word "comprising" does not exclude other elements or steps, and the indefinite article "a" does not exclude a plurality.

A single unit or device may perform the functions of multiple elements recited in the claims. The fact that individual functions and elements are recited in different dependent claims does not mean that a combination of those functions and elements could not advantageously be used.

| List of reference signs | |
| --- | --- |
| 103 | male coupling part |
| 104 | female coupling part |
| 109 | Flange |
| 120 | second seal |
| 122 | Flange |
| 132 | first seal |
| 200 | Coupling |
| 201 | male coupling part |
| 202 | female coupling part |
| 203 | first transfer line |
| 204 | second transfer line |
| 206 | inner pipe |
| 207 | outer pipe |
| 208 | evacuated space |
| 210 | inner tube |
| 211 | outer tube |
| 212 | space |
| 213 | double arrow |
| 214 | flange |
| 215 | Contact surface |
| 216 | Front face |
| 217 | Inner tube |
| 218 | Outer tube |
| 219 | flange |
| 221 | Sealing surface/Circular step |
| 223 | seal |
| 224 | Contact surface |
| 301 | Collar |
| 302 | Cylindrical seal |

The invention claimed is:

1. A coupling for connecting a first and a second multi-walled line each one having at least two concentric pipes, which are separated by a space, said coupling comprising:
   a female coupling part comprising at least two concentric tubes including an inner and an outer tube each connected at one end with one of the concentric pipes of the first multi-walled line, wherein the other ends of the at least two concentric tubes are joined in a fluid tight manner, wherein the inner tube is provided with a sealing surface;
   a male coupling part comprising at least two concentric tubes including an inner and an outer tube each connected at one end with one of the concentric pipes of the second multi-walled line, wherein the other ends of the at least two concentric tubes are joined in a fluid tight manner,

wherein the at least two concentric tubes of the female and/or male coupling parts are compressible and/or expandable in an axial direction, and
   wherein the sealing surface of the female coupling part is provided with a collar.

2. The coupling according to claim 1, wherein the at least two concentric tubes of the female and/or male coupling part are corrugated.

3. The coupling according to claim 1, wherein the sealing surface is angled relative to the axial direction of the inner tube.

4. The coupling according to claim 1, wherein the female and male coupling parts comprise a flange.

5. The coupling according to claim 4, wherein a seal is arranged between the flanges.

6. The coupling according to claim 4, wherein a distance between the front end of the male coupling part and a contact surface of the associated flange is larger than the distance between the surface of the sealing surface of the female coupling part and a contact surface of the associated flange.

7. The coupling according to claim 1, wherein the collar accommodates a tubular and/or conical seal on an inner or outer perimeter of said collar.

8. The coupling according to claim 7, wherein the tubular seal has a larger or smaller coefficient of thermal expansion than the collar.

9. The coupling according to claim 1, wherein the space between the at least two concentric pipes of the first and/or second multi-walled line is evacuated, filled with air, inert gas or with a medium for temperature control of the inner pipe.

10. A transfer device for cryogenic fluids comprising a coupling according claim 1.

11. A coupling for connecting a first and a second multi-walled line each one having at least two concentric pipes, which are separated by a space, said coupling comprising:
   a female coupling part comprising at least two concentric tubes including an inner and an outer tube each connected at one end with one of the concentric pipes of the first multi-walled line, wherein the other ends of the at least two concentric tubes are joined in a fluid tight manner, wherein the inner tube is provided with a sealing surface; and
   a male coupling part comprising at least two concentric tubes including an inner and an outer tube each connected at one end with one of the concentric pipes of the second multi-walled line, wherein the other ends of the at least two concentric tubes are joined in a fluid tight manner,
   wherein the at least two concentric tubes of the female and/or male coupling parts are compressible and/or expandable in an axial direction,
   wherein the coupling comprises a seal that is arranged between the sealing surface of the female coupling part and a front end of the male coupling part, and
   wherein the sealing surface of the female coupling part is provided with a collar.

12. The coupling according to claim 11, wherein the seal is attached to the female or male coupling part.

* * * * *